US012244900B2

(12) United States Patent
Yelton et al.

(10) Patent No.: US 12,244,900 B2
(45) Date of Patent: *Mar. 4, 2025

(54) METHODS AND SYSTEMS FOR RECOMMENDING CONTENT IN CONTEXT OF A CONVERSATION

(71) Applicant: Adeia Guides Inc., San Jose, CA (US)

(72) Inventors: Alexis Yelton, Somerville, MA (US); Abhijeet Sharma, Boston, MA (US); Peter Boonstra, Arlington, MA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,166

(22) Filed: Jun. 13, 2023

(65) Prior Publication Data
US 2023/0328325 A1 Oct. 12, 2023

Related U.S. Application Data

(63) Continuation of application No. 17/466,850, filed on Sep. 3, 2021, now Pat. No. 11,716,514, which is a
(Continued)

(51) Int. Cl.
*H04N 21/466* (2011.01)
*G06F 16/334* (2025.01)
(Continued)

(52) U.S. Cl.
CPC ..... *H04N 21/4668* (2013.01); *G06F 16/3344* (2019.01); *G06F 16/683* (2019.01);
(Continued)

(58) Field of Classification Search
CPC ... G06F 16/3344; G06F 16/683; G10L 15/08; G10L 15/1822; G10L 15/22;
(Continued)

(56) References Cited

U.S. PATENT DOCUMENTS 6,065,042 A * 5/2000 Reimer ................ G06F 16/78
348/E7.071
6,239,794 B1 5/2001 Yuen et al.
(Continued)

FOREIGN PATENT DOCUMENTS

CN 101176087 A 5/2008
CN 102567441 A 7/2012
(Continued)

OTHER PUBLICATIONS

PCT International Search Report and Written Opinion for International Application No. PCT/US2018/038965, dated mailed on Sep. 6, 2018 (15 pages).

*Primary Examiner* — Michael B. Pierorazio
(74) *Attorney, Agent, or Firm* — Haley Guiliano LLP

(57) ABSTRACT

A media guidance application may monitor a conversation among users, and identify keywords in the conversation, without the use of wakewords. The keywords are used to search for media content that is relevant to the on-going conversation. Accordingly, the media guidance application presents relevant content to the users, during the conversation, to more actively engage the users. A conversation monitoring window may be used to present conversation information as well as relevant content. A listening mode may be used to manage when the media guidance application processes speech from a conversation. The media guidance application may access user profiles for keywords, select content types, select content sources, and determine relevancy of media content, to provide content in context of a conversation.

20 Claims, 9 Drawing Sheets

Related U.S. Application Data continuation of application No. 15/824,788, filed on Nov. 28, 2017, now Pat. No. 11,140,450.

(51) Int. Cl.
*G06F 16/683* (2019.01)
*G10L 15/08* (2006.01)
*G10L 15/22* (2006.01)
*H04N 21/439* (2011.01)
*H04N 21/442* (2011.01)
*H04N 21/8405* (2011.01)
*G10L 15/18* (2013.01)
*H04N 21/4223* (2011.01)
*H04N 21/482* (2011.01)

(52) U.S. Cl.
CPC .............. *G10L 15/08* (2013.01); *G10L 15/22* (2013.01); *H04N 21/4394* (2013.01); *H04N 21/44213* (2013.01); *H04N 21/8405* (2013.01); *G10L 2015/088* (2013.01); *G10L 15/1822* (2013.01); *G10L 2015/225* (2013.01); *G10L 2015/227* (2013.01); *H04N 21/4223* (2013.01); *H04N 21/4821* (2013.01)

(58) Field of Classification Search
CPC ......... G10L 2015/088; G10L 2015/225; G10L 2015/227; H04N 21/4223; H04N 21/439; H04N 21/4394; H04N 21/44213; H04N 21/4668; H04N 21/4821; H04N 21/8405
See application file for complete search history.

(56) References Cited

U.S. PATENT DOCUMENTS

| | | | | |
|---|---|---|---|---|
| 6,564,378 | B1 | 5/2003 | Satterfield et al. | |
| 6,658,662 | B1* | 12/2003 | Nielsen | H04N 7/16 348/E7.054 |
| 7,035,468 | B2* | 4/2006 | Yogeshwar | G06F 16/71 707/E17.031 |
| 7,092,888 | B1* | 8/2006 | McCarthy | G10L 15/1822 704/277 |
| 7,110,664 | B2* | 9/2006 | Yogeshwar | H04N 5/76 386/328 |
| 7,165,098 | B1 | 1/2007 | Boyer et al. | |
| 7,664,678 | B1* | 2/2010 | Haber | G06Q 30/0639 705/26.9 |
| 7,761,892 | B2 | 7/2010 | Ellis et al. | |
| 7,774,815 | B1* | 8/2010 | Allen | H04N 21/8133 725/51 |
| 7,801,910 | B2* | 9/2010 | Houh | G06F 16/583 707/765 |
| 7,814,524 | B2* | 10/2010 | Candelore | H04N 21/47 725/39 |
| 7,908,628 | B2* | 3/2011 | Swart | H04N 21/6377 725/135 |
| 8,046,801 | B2 | 10/2011 | Ellis et al. | |
| 8,079,054 | B1* | 12/2011 | Dhawan | H04N 21/812 705/14.6 |
| 8,209,724 | B2* | 6/2012 | Rathod | H04N 21/435 348/715 |
| 8,296,808 | B2* | 10/2012 | Hardacker | H04N 21/482 725/51 |
| 8,346,558 | B2 | 1/2013 | Narahara et al. | |
| 8,423,363 | B2* | 4/2013 | Gupta | G10L 15/22 704/251 |
| 8,572,488 | B2* | 10/2013 | Phillips | G06F 3/0482 715/716 |
| 9,420,227 | B1 | 8/2016 | Shires et al. | |
| 9,462,340 | B1* | 10/2016 | Mathurin | H04N 21/8106 |
| 9,812,173 | B2 | 11/2017 | Ueda | |
| 11,140,450 | B2 | 10/2021 | Yelton et al. | |
| 11,716,514 | B2 | 8/2023 | Yelton et al. | |
| 2002/0133562 | A1* | 9/2002 | Newnam | G06Q 30/02 709/216 |
| 2002/0162117 | A1* | 10/2002 | Pearson | H04N 21/4758 725/135 |
| 2002/0170068 | A1* | 11/2002 | Rafey | H04N 21/4782 348/E7.071 |
| 2002/0174430 | A1 | 11/2002 | Ellis et al. | |
| 2003/0025832 | A1* | 2/2003 | Swart | H04N 21/4828 348/E7.071 |
| 2003/0206717 | A1* | 11/2003 | Yogeshwar | G11B 27/10 386/328 |
| 2004/0073493 | A1* | 4/2004 | Kato | H04N 7/17318 348/E7.071 |
| 2004/0096110 | A1* | 5/2004 | Yogeshwar | G06F 16/51 707/E17.031 |
| 2005/0066352 | A1* | 3/2005 | Herley | H04N 21/42203 348/E7.071 |
| 2005/0188411 | A1* | 8/2005 | Dacosta | G06F 16/4387 348/E7.071 |
| 2005/0234992 | A1 | 10/2005 | Haberman | |
| 2005/0251827 | A1 | 11/2005 | Ellis et al. | |
| 2006/0015339 | A1* | 1/2006 | Charlesworth | G10L 15/187 704/E15.02 |
| 2007/0061862 | A1* | 3/2007 | Berger | H04N 7/163 725/62 |
| 2007/0112837 | A1* | 5/2007 | Houh | G06F 16/489 707/E17.02 |
| 2007/0124756 | A1* | 5/2007 | Covell | G06F 16/635 348/E7.071 |
| 2007/0124788 | A1* | 5/2007 | Wittkoter | H04N 7/165 348/E7.071 |
| 2008/0091713 | A1* | 4/2008 | Candelore | H04N 7/163 |
| 2008/0097984 | A1* | 4/2008 | Candelore | H04N 21/4332 707/999.005 |
| 2008/0204595 | A1* | 8/2008 | Rathod | H04N 21/44008 348/E7.001 |
| 2008/0235018 | A1 | 9/2008 | Eggen et al. | |
| 2008/0262996 | A1* | 10/2008 | Yogeshwar | G06F 16/71 707/E17.031 |
| 2008/0266449 | A1* | 10/2008 | Rathod | H04N 21/8133 348/E7.001 |
| 2008/0285940 | A1* | 11/2008 | Kulas | H04N 21/4858 386/353 |
| 2009/0094632 | A1* | 4/2009 | Newnam | H04N 21/43074 725/24 |
| 2009/0112592 | A1* | 4/2009 | Candelore | H04N 21/42203 704/E15.001 |
| 2009/0293081 | A1* | 11/2009 | Pirani | H04N 21/4334 707/999.003 |
| 2009/0299752 | A1* | 12/2009 | Rodriguez | G06F 40/242 704/E15.001 |
| 2010/0153885 | A1 | 6/2010 | Yates | |
| 2010/0316131 | A1* | 12/2010 | Shanableh | H04N 19/61 375/E7.011 |
| 2011/0069940 | A1* | 3/2011 | Shimy | H04N 21/4532 386/296 |
| 2011/0145883 | A1* | 6/2011 | Godar | H04N 5/445 725/131 |
| 2011/0283189 | A1* | 11/2011 | McCarty | H04N 21/4532 715/810 |
| 2011/0289530 | A1* | 11/2011 | Dureau | G06F 16/48 725/38 |
| 2012/0016678 | A1* | 1/2012 | Gruber | G06F 16/9537 704/E21.001 |
| 2012/0034904 | A1 | 2/2012 | Lebeau et al. | |
| 2012/0210349 | A1* | 8/2012 | Campana | G06F 3/1438 725/78 |
| 2013/0159003 | A1 | 6/2013 | Kim et al. | |
| 2013/0216206 | A1* | 8/2013 | Dubin | G11B 27/031 386/282 |
| 2014/0168354 | A1 | 6/2014 | Clavel et al. | |
| 2014/0181865 | A1* | 6/2014 | Koganei | H04N 21/4312 725/38 |
| 2014/0278834 | A1* | 9/2014 | Lautz | G06Q 30/0245 705/12 |
| 2014/0330909 | A1 | 11/2014 | Cleaver et al. | |

(56) References Cited

U.S. PATENT DOCUMENTS

| | | | |
|---|---|---|---|
| 2014/0350925 A1* | 11/2014 | Park | G10L 15/22 |
| | | | 704/231 |
| 2014/0373082 A1* | 12/2014 | Miyazaki | H04N 21/4415 |
| | | | 725/110 |
| 2015/0078730 A1 | 3/2015 | Ueda | |
| 2015/0082349 A1* | 3/2015 | Ishtiaq | H04N 21/4316 |
| | | | 725/40 |
| 2015/0229975 A1* | 8/2015 | Shaw | H04N 21/6587 |
| | | | 725/10 |
| 2017/0092332 A1 | 3/2017 | Bostick et al. | |
| 2018/0218734 A1 | 8/2018 | Somech et al. | |
| 2021/0400349 A1 | 12/2021 | Yelton et al. | |

FOREIGN PATENT DOCUMENTS

| | | |
|---|---|---|
| CN | 106021600 A | 10/2016 |
| CN | 106462636 A | 2/2017 |
| CN | 107222757 A | 9/2017 |
| JP | 2003316710 A | 11/2003 |
| JP | 2008162233 A | 7/2008 |
| JP | 2008171173 A | 7/2008 |
| JP | 2009088687 A | 4/2009 |
| JP | 2011180271 A | 9/2011 |
| JP | 2015052745 A | 3/2015 |
| JP | 2015084504 A | 4/2015 |
| JP | 2015146574 A | 8/2015 |
| JP | 2015162233 A | 9/2015 |
| WO | 0184539 A1 | 11/2001 |

* cited by examiner

700

Monitor, with user equipment, verbal conversation among a plurality of users
702

↓

Detect keywords in the verbal conversation without receiving a wakeword
704

↓

Search for content matching one of the keywords
706

↓

Automatically, without receiving the wakeword, present the content to the users
708

Monitor, with user equipment, verbal conversation among a plurality of users
802

As the verbal conversation continues, process words in the verbal conversation to selectively retrieve keywords from the verbal conversation
804

Detect the keywords in the verbal conversation without receiving a wakeword based on the selectively retrieved keywords
806

Search a plurality of clips for a clip matching one of the keywords
808

Compare metadata associated with each of the plurality of clips with the detected keywords
810

Select, based on the comparing, the clip of the plurality of clips having metadata matching more of the keywords than metadata associated with another one of the clips
812

Automatically, without receiving the wakeword, present the clip to the users during the verbal conversation
814

FIG. 8

METHODS AND SYSTEMS FOR RECOMMENDING CONTENT IN CONTEXT OF A CONVERSATION

CROSS-REFERENCE TO RELATED APPLICATIONS

This application is a continuation of U.S. patent application Ser. No. 17/466,850, filed Sep. 3, 2021, which is a continuation of U.S. patent application Ser. No. 15/824,788, filed Nov. 28, 2017, (now U.S. Pat. No. 11,140,450), the disclosures of each application are incorporated by reference in their entireties.

BACKGROUND

Voice-activated personal assistants are sometimes used to find ways to tailor content and connect with users. A user can provide voice commands to the assistant and the assistant responds. Sometimes a group of users may be discussing media content such as a movie, or an especially interesting scene. Typical systems require that one of the users provide a query or perform a search to find something related to the conversation, which could disrupt the conversation. Such interactions are inefficient and take away from the user's enjoyment of media consumption.

Aside from the effort to form a query and parse search results, users may also not know where to search for content relevant to their conversation. Trying to figure out a content source, identifying a particular media asset of interest, and displaying that asset are likely not desired, especially in keeping the conversation engaging and dynamic.

SUMMARY

This disclosure describes a voice-activated personal assistant, which may be an aspect of a media guidance application, that listens to a conversation and provides content automatically at the appropriate insertion point in the conversation. For example, the personal assistant may have a television listening mode and regular mode. When in the television listening mode, and while a user may be conversing with another user about a recent football game, the system automatically identifies what aspect of the game the users are discussing and automatically finds and generates a clip of the game. The system presents the clip during the conversation, making the clip a relevant part of the conversation. In a further example, if a user is discussing a particular scene in a media asset or series, e.g., Game of Thrones (GOT), the personal assistant may play the scene being discussed. The system also can select one or more sources to search based on the conversation. For example, if a group of users are talking about viral content, the system might only search social media sources, but if they are talking about a sporting event, the system may first search sports sources and then secondary sources (e.g., social media) for relevant content.

Accordingly, systems and methods for providing a media guidance application that recommends content in the context of a conversation by monitoring (e.g., with user equipment) the conversation among a plurality of users are provided. The media guidance application automatically detects keywords in the conversation without receiving a wakeword, and searches for content matching one of the keywords for presentation to the users during the conversation. Without receiving the wakeword, the media guidance application automatically presents the content to the users. A wakeword, as used herein, is a recognized command word that the media guidance application is configured to respond to with a predetermined action.

The media guidance application recommends content in the context of a conversation by monitoring (e.g., with user equipment) the conversation among a plurality of users. As the verbal conversation continues, the media guidance application processes words in the verbal conversation to selectively retrieve keywords from the words in the verbal conversation. The media guidance application detects the keywords in the verbal conversation without receiving a wakeword that is based on the selectively retrieved keywords. The media guidance application searches a plurality of clips for a clip matching one of the keywords by comparing metadata associated with each of the plurality of clips with the detected keywords, and selecting (e.g., based on the comparing) the clip of the plurality of clips having metadata matching more of the keywords than metadata associated with another one of the clips. The media guidance application automatically, and without receiving the wakeword, presents the clip to the users during the verbal conversation. Each of the plurality of clips may, in some implementations, be less than a threshold duration.

In some embodiments, the media guidance application identifies a content type associated with detected keywords in a conversation among two or more users, and selects a content source to search based on the identified content type. For example, if keywords included the word "football," then the media guidance application may identify the content type as a sports clip based on the word "football." Accordingly, by identifying the content type as a sports clip, the media guidance application may more efficiently search, and/or locate, sports-related content from, for example, a sports-themed media source.

In some embodiments, the media guidance application generates a verbal conversation processing window, and temporarily stores words in the verbal conversation detected within the conversation processing window, such that words detected prior to a start time of the window are discarded. The conversation processing window refers to a time period over which the conversation occurs and is processed, and presentation of relevant content. When a conversation is detected, the media guidance application may initiate a conversation processing window, and maintain the window, for example, while the conversation is still occurring.

In some embodiments, the media guidance application activates a listening mode, in which monitoring is performed when the listening mode is active and is not performed when the listening mode is disabled. Accordingly, the listening mode may be used to define when the media guidance application is "eavesdropping." For example, the media guidance application may begin processing audio signals for speech only when some audio input is detected, so that the media guidance application is not wasting processing resources when no conversation is present.

In some embodiments, keywords may relate to a segment in a media asset, and each of a plurality of searched clips represents content in a scene of the media asset. For example, the segment could be an entire scene, or a portion thereof. In a further example, the segment could be a portion of the media asset featuring a play in a sporting event.

In some embodiments, the media guidance application automatically presents content to users during a verbal conversation by changing content currently being presented on the user equipment to present the clip. For example, users may initially be watching a program on a user device, and then begin conversing while the program continues to play.

The media guidance application may present a relevant clip in the context of the conversation, and stop presenting the program that was initially playing.

In some embodiments, the media guidance application presents some of the detected keywords with a clip, with an indication that the clip was selected in response to detecting the keywords in the conversation. For example, along with a relevant clip, the media guidance application may display keyword text so that the users can recognize why the clip is playing. This may be especially useful, for example, if one or more keywords were incorrect (e.g., processing erroneously), and the clip was not relevant. Displaying keywords may also serve as user feedback, helping the media guidance application to interact with users. For example, the media guidance application may display keywords, which may prompt a user to actively utter additional words to refine or tailor the keyword search (e.g., by adding more relevant keywords).

In some embodiments, the media guidance application selectively retrieves keywords by identifying words in the verbal conversation that match user profiles of each of the plurality of users. A user's profile may include information such as, for example, user preferences (e.g., favorite shows, favorite genre, favorite actress), the user's viewing history, common keywords associated with the user's media consumption, personal information, names of other users that may be relevant for conversation, or other information about the user. For example, the media guidance application may identify words in a conversation such as "Jamie" and "Jon," and access one of the user's profiles to identity Game of Thrones (GOT) as a favorite show. Accordingly, the media guidance application may recognize "Jamie" and "Jon" as characters in GOT, and add "Game of Thrones" to the keywords, or search keywords among Game of Thrones clips.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is a flowchart of an illustrative process for recommending content in context of a conversation, in accordance with some embodiments of the disclosure;

FIG. 8 is a flowchart of an illustrative process for recommending content in context of a conversation, in accordance with some embodiments of the disclosure;

DETAILED DESCRIPTION

This disclosure describes a voice-activated personal assistant, which may be an aspect of a media guidance application, that listens to a conversation and provides content automatically at the appropriate insertion point in the conversation. For example, the personal assistant may have a television listening mode and regular mode. When in the television listening mode, and while a user may be conversing with another user about a recent football game, the system automatically identifies what aspect of the game the users are discussing and automatically finds and generates a clip of the game. The system presents the clip during the conversation, making the clip a relevant part of the conversation. In a further example, if a user is discussing a particular scene in a media asset or series, e.g., Game of Thrones (GOT), the personal assistant may play the scene being discussed. The system also can select one or more sources to search based on the conversation. For example, if a group of users are talking about viral content, the system might only search social media sources, but if they are talking about a sporting event, the system may first search sports sources and then secondary sources (e.g., social media) for relevant content.

Figure 1:
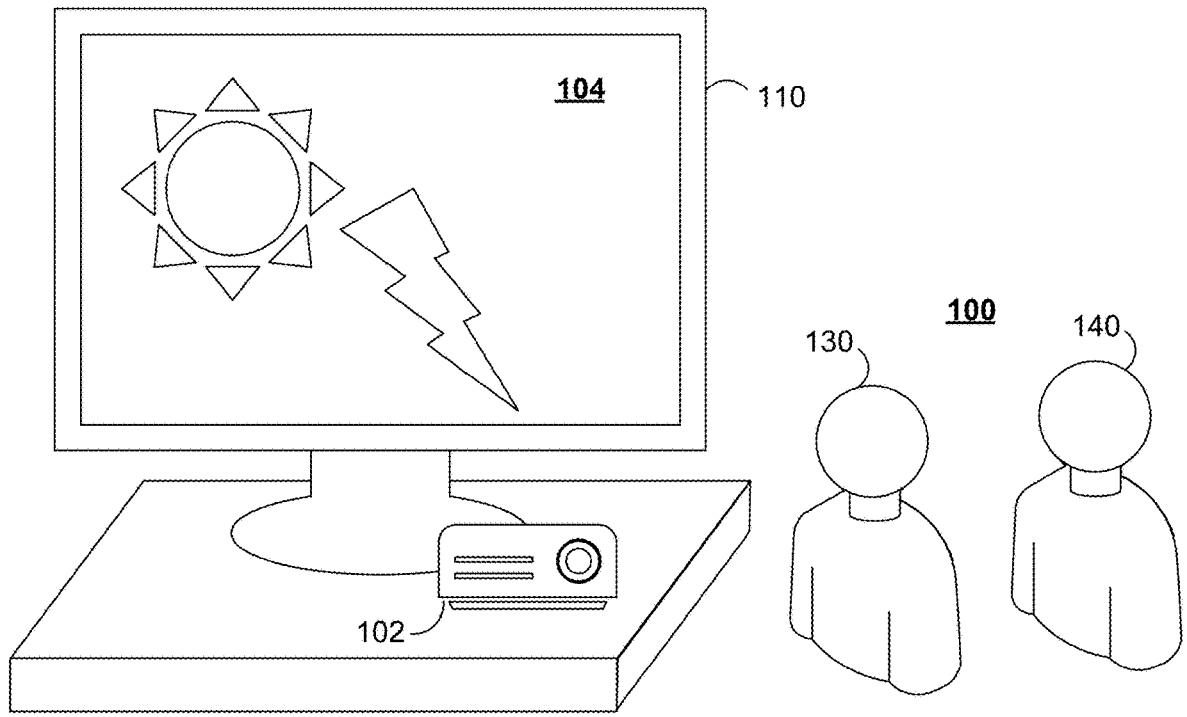
FIG. 1 shows an illustrative embodiment of recommending content in context of a conversation, in accordance with some embodiments of the disclosure.

FIG. 1 shows an illustrative embodiment of recommending content in context of conversation 100, in accordance with some embodiments of the disclosure. A media guidance application may monitor conversation 100 between user 130 and user 140 with user device 102, which is coupled to display device 110 (e.g., a television). User device 102 includes an audio input device (i.e., a microphone integrated in the device to detect audio signals). While illustratively shown as a separate device coupled to display device 110, a user device (e.g., user device 102) may alternatively, or additionally, include a mobile phone, computer, integrated display and processing circuitry (e.g., a smart TV), or any other suitable device in accordance with the description of FIGS. 5-6 of the present disclosure. User 130 and user 140 may be engaged in a conversation about a given media asset (e.g., Game of Thrones (GOT)), and more particularly about whether Jon Snow (i.e., a character in Game of Thrones) is alive in the latest episodes. For example, an example of illustrative conversation 100 is shown below.

Example 1 of Illustrative Conversation 100

User 130: "Did you see that last GOT episode?"
User 140: "No, what happened? I heard Jon Snow-"
User 130 (interrupting): "What! Don't tell me what happened to Jon Snow!"
User 140: "I think he is alive."

As conversation 100 begins (e.g., user device 102 detects audio signals from conversation 100), the media application may begin processing speech. For example, the media guidance application may initiate a verbal conversation processing window, and begin storing audio signals in memory. Further, the verbal processing window may list the entirety of conversation 100. Illustrative conversation 100 includes two users (user 130 and user 140), and, for example, five seconds of speech. Among the five seconds of speech, the media guidance application may identify one or more keywords. For example, the media guidance application may identify "GOT," "episode," "Jon," "Snow," "alive," "happened," and "last" as words in Example 1 of conversation 100. In some embodiments, a media guidance application may identify keywords "Jon Snow alive," which may be trending on social media. Accordingly, the media guidance application may, for example, solely consider social media as a content source when searching for relevant content. For example, some social media services may present keywords or content that is trending within their networks. For example, Facebook or Twitter may present currently trending topics, content, sites, or information. The media guidance application may access social media networks and identify what's trending (e.g., based on keywords). In a further example, the media guidance application may query a third-party service to deliver information about, store, organize, categorize, or otherwise manage the identification of trends. In a further example, the media guidance application may access social media accounts of users 130 and 140 (e.g., if they are logged in), to determine what is trending.

Further, illustrative conversation 100 may occur while user 130 and user 140 are already watching a program on display screen 104. The media guidance application may manage display screen 104 to present relevant content to users 130 and 140, as shown in illustrative FIG. 2.

Figure 2:
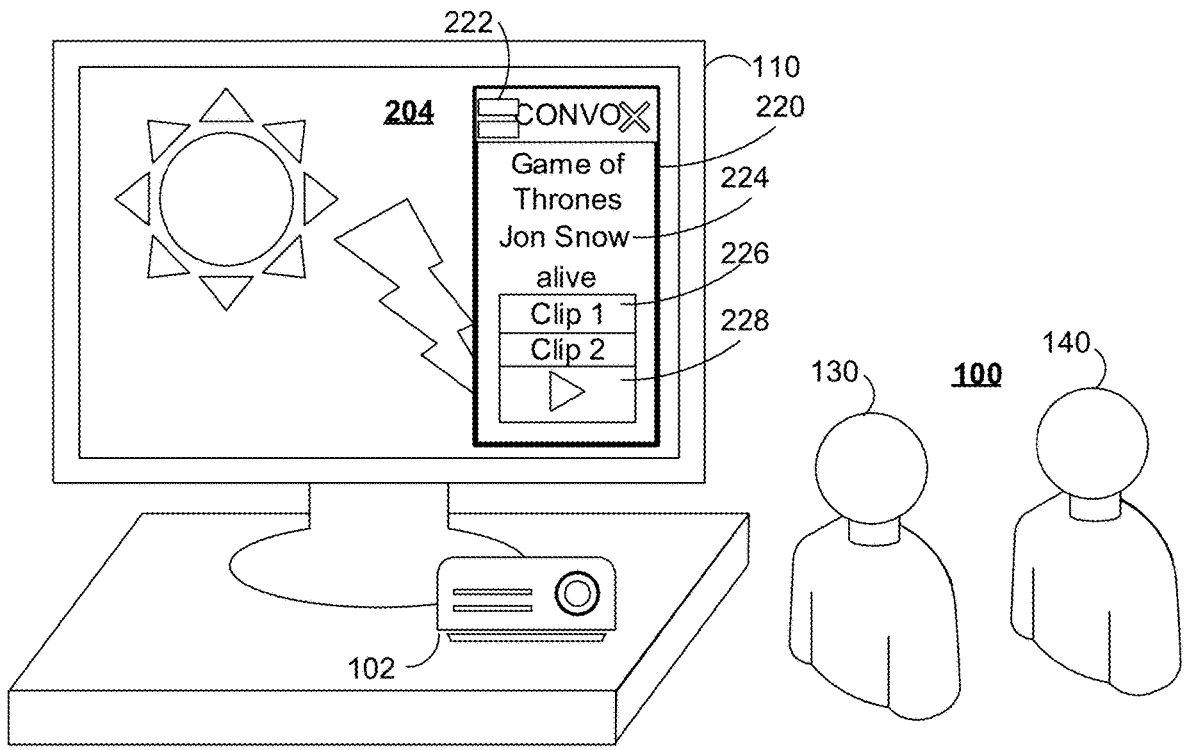
FIG. 2 shows an illustrative embodiment of recommending content in context of a conversation, in accordance with some embodiments of the disclosure.

FIG. 2 shows an illustrative embodiment of recommending content in context of conversation 100, in accordance with some embodiments of the disclosure. In response to detecting conversation 100, the media guidance application may generate a conversation processing display 220, which may include, for example, option bar 222, keyword display 224, content listings 226, and video region 228. The media guidance application may generate display 204, which includes elements of display 104, and conversation processing display 220. Option bar 222 may include search options (e.g., to refine, limit, or otherwise affect searching a plurality of clips), selection criteria (e.g., to apply preferences, or otherwise affect a selected clip), display options (e.g., present conversation processing display 220 as an overlay, full screen, or split screen; pause previously displayed program; close conversation processing display 220), any other suitable options, or any combination thereof. Keyword display 224 may include one or more displayed keywords identified from conversation 100. Keyword display 224 may present all identified keywords, some identified keywords, all keywords used in performing a search for content, some keywords used in performing a search for content, any other suitable group of keywords, or any combination thereof. Content listing 226 may include one or more media asset listings (e.g., displayed with an indicator such as index in list, other identifier, or title). Video region 228 may include a playable clip. Any suitable playing option may be included as part of video region 228 such as, for example, play, pause, stop, rewind, fast-forward, scroll, or other suitable options.

As shown illustratively in FIG. 2, conversation 100 is still underway as a relevant clip is presented in video region 228. The media guidance application may be configured to provide the relevant clip during conversation 100 to enhance the conversation, or not diminish the conversation. Accordingly, as user 130 and use 140 converse about GOT, they do not need to actively attend to the media guidance application, initiate a search, parse search results, or otherwise distract themselves from conversation 100. The media guidance application, by not requiring a wakeword, may thus perform, for example, keyword detection, content searching, content selection, and content presentation without receiving command input from a user. In some circumstances, the media guidance application may perform conversation processing without users 130 and 140 noticing, likely until the clip is presented. Accordingly, the media guidance application may provide supplemental input to the conversation, and perhaps stimulate further conversation. In some embodiments, the media guidance application may detect a lull or break in the conversation by identifying time periods during which audio input is below a threshold (e.g., audio signal energy is below a threshold, audio signal amplitude is below a threshold). Natural conversation may include lulls (e.g., quieter or less frequent talking), breaks (e.g., no talking), switches among speakers (e.g., taking turns speaking), interruptions, and multiple people talking at the same time. Accordingly, the media guidance application may present the clip during a detected lull or break in the conversation (e.g., to be less intrusive). In some embodiments, the media guidance application may present the clip during active conversing (e.g., not during a lull or break). For example, presentation of the clip during active conversing may fit more readily, and timely, into the conversation.

Another example (i.e., Example 2) is provided below, using conversation 100 as a reference.

Example 2 of Illustrative Conversation 100

User 130: "Wow, I love the Detroit Lions!"
User 140: "Yeah, that game last night was great."
User 130: "What? I totally missed it, who won?"
User 140: "Nevermind, but there was that last interception!"

Example 2 of conversation 100 includes keywords, "Detroit Lions," "game," "last night," and "interception," which the media guidance application may recognize as being sports-related. The media guidance application may compare recognized words with known words to categorize keywords. For example, the media guidance application may search a database (e.g., media guidance data source 618) that stores content types and content sources. By providing keywords in a suitable search query, the media guidance application may search the database (e.g., using any suitable search technique) to retrieve a content type and a content source. Accordingly, under such circumstances, the media guidance application may, in some embodiments, preferentially select a content source that provides, categorizes, or stores sports highlights. Further, the media guidance application may recognize the keyword "last night" as being related to a time and date. For example, the media guidance application may consider a date and time of conversation 100, and accordingly search clips with an associated date one day before the current date, with a time after 5 pm (e.g., corresponding to "last night"). Accordingly, keywords used for searching may be, but need not be, verbatim matches to identified words from the conversation. In some embodiments, the media guidance application may convert an entire conversation into words using speech processing, and then perform a full text search of the converted conversation to identify keywords. In some embodiments, the media guidance application may convert the conversation into text in intra-conversation segments and process words from the segments, so that the conversation does not need to end in order or it to start processing.

The media guidance application may perform the illustrative steps disclosed herein (e.g., in the context of FIGS. 1-2, and FIGS. 7-10) using a verbal conversation processing window that is suitable for conversation 100. Accordingly, the media guidance application may recognize speech, identify keywords, search for content based on the keywords, select content, and present the content in a prescribed amount of time. Accordingly, the media guidance application may perform the illustrative steps disclosed herein on any suitable time scale in the context of a conversation (e.g., conversation 100). The time scale of the verbal conversation processing window (e.g., the duration of the window) may be predetermined, may depend on the conversation itself (e.g., how long the conversation is, the topic of the conversation, the participants in the conversation), the equipment performing the actions of the media guidance application (e.g., the available memory and processing power), a user-specified time scale, a predetermine time scale, a length of relevant content (e.g., a football play has a typical time scale of up to 10 seconds; a football game may have a typical time scale of several hours).

For example, referencing FIGS. 1-2, if the elapsed time from detecting conversation 100 to presenting a relevant clip is a few seconds, or even 10 seconds, conversation 100 may likely still be ongoing, or is "fresh." In some circumstances, if the elapsed time were a minute (e.g., from the start of conversation 100, or from the end of conversation 100), conversation 100 may benefit less from the clip, while under other circumstances a minute still falls within the duration of conversation 100. If the elapsed time were an hour, one or both of users 130 or 140 might not still be present (e.g., although presentation or storage of the useful clip may still be desired).

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the media guidance application may include a voice-activated electronic assistant (also "voice-activated personal assistant," or "electronic assistant"). An electronic assistant may be capable of speech recognition such as, for example, receiving voice commands and recognizing spoken words and phrases. An electronic assistant may be configured to recognize speech, speak (e.g., output voice messages), analyze speech (e.g., detect words, detect phrases, detect who is speaking), manage media content, present media content to a user, manage responses to users' conversation, perform any other suitable actions to assist in managing content, or any combination thereof. For example, an electronic assistant may detect patterns in speech, and recognize one or more wake words, which may indicate a desired action of the electronic assistant. Illustratively, a user may, for example, speak "awake" and an electronic assistant may begin speech recognition. In some embodiments, an electronic assistant may recognize speech without utterance of a wake word or other indication that a command is desired (e.g., by a user).

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
FIG. 3 shows an illustrative embodiment of a display screen that may be used to provide media guidance application listings and other media guidance information, in accordance with some embodiments of the disclosure.
Figure 4:
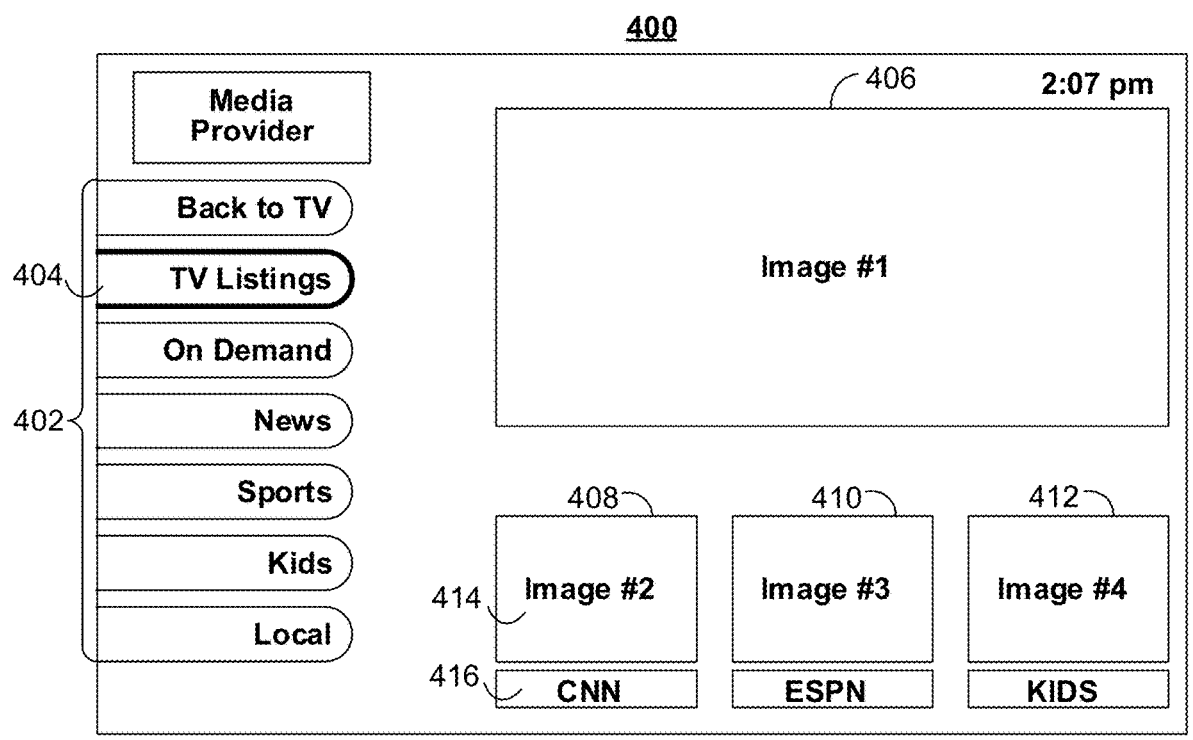
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 324. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 324 may allow the user to access different types of content, media guidance application displays, and/or media guidance application features. Options region 324 may be part of display 300 (and other display screens described herein), or may be invoked by a user by selecting an on-screen option or pressing a dedicated or assignable button on a user input device. The selectable options within options region 324 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
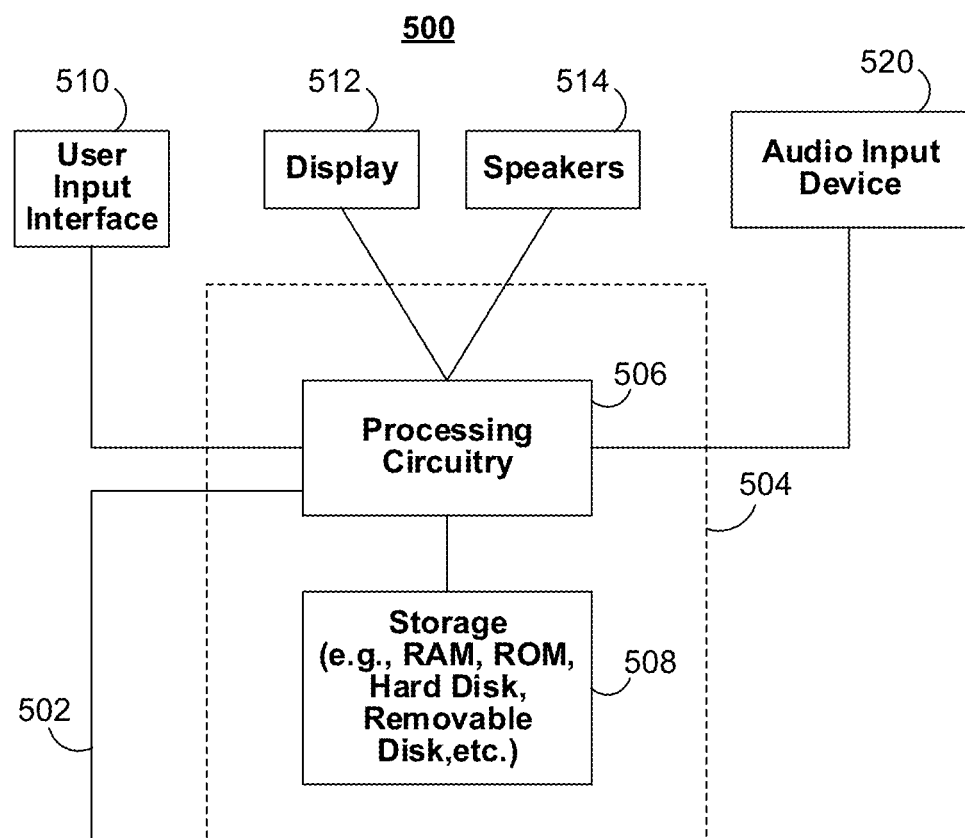
FIG. 5 is a block diagram of an illustrative device, in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Audio input device 520 may include a microphone, or other suitable device which may receive audio signals from the environment (e.g., nearby users conversing), and convert the audio signal to an electronic signal, optical signal, any other signal that may be processed and communicated, or any combination thereof. Audio input device 520 may include a wire-coil type microphone, capacitive microphone, piezo-electric microphone, preamplifiers, signal amplifiers, signal conditioners, filters, any other suitable components, or any combination thereof. In some embodiments, audio input device 520 may include processing circuitry to process audio signals, and communicate processed signals to control circuitry 506 (e.g., for further processing). In some embodiments, audio input device 520 may include a mechanism (e.g., to convert sound waves into electrical or optical signals), and most substantive processing of the signal is performed by control circuitry 506. For example, audio input device 520 may include a microphone and amplifier for transmitting a corresponding electrical signal to control circuitry 506, and control circuitry 506 may perform speech recognition, voice recognition, or otherwise process a verbal conversation. In some embodiments, audio input device 520 may be integrated as part of a user device (e.g., a built-in microphone). For example, referencing FIG. 1, user device 102 may include an integrated microphone for detecting speech.

Figure 6:
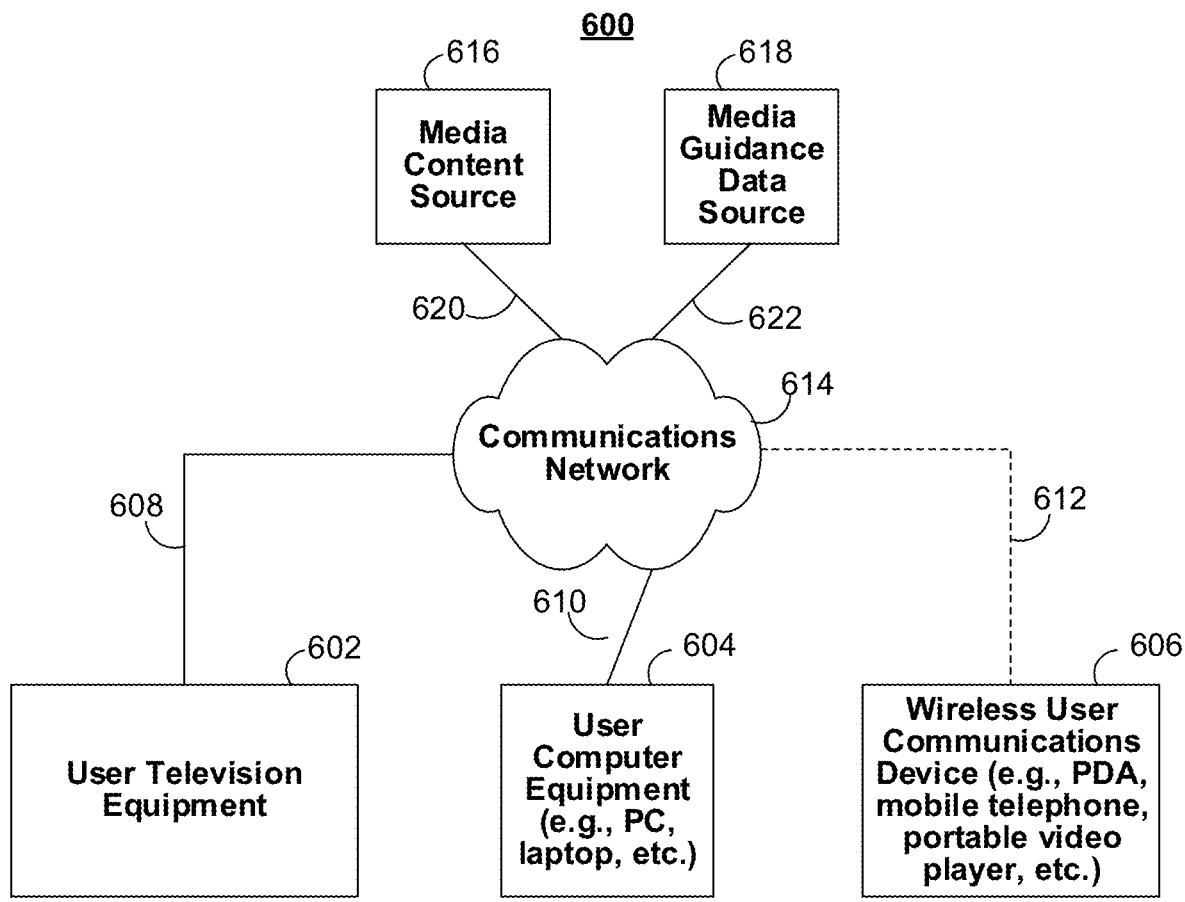
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which the media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

System 600 may also include an advertisement source 624 coupled to communications network 614 via a communications path 626. Path 626 may include any of the communication paths described above in connection with paths 608, 610, and 612. Advertisement source 624 may include advertisement logic to determine which advertisements to transmit to specific users and under which circumstances. For example, a cable operator may have the right to insert advertisements during specific time slots on specific channels. Thus, advertisement source 624 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 624 may be configured to maintain user information including advertisement-suitability scores associated with user in order to provide targeted advertising. Additionally or alternatively, a server associated with advertisement source 624 may be configured to store raw information that may be used to derive advertisement-suitability scores. In some embodiments, advertisement source 624 may transmit a request to another device for the raw information and calculate the advertisement-suitability scores. Advertisement source 624 may update advertisement-suitability scores for specific users (e.g., first subset, second subset, or third subset of users) and transmit an advertisement of the target product to appropriate users.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via the media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with the media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, the media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 7 is a flowchart of an illustrative process 700 for recommending content in context of a conversation, in accordance with some embodiments of the disclosure. For example, the media guidance application may instruct control circuitry 604 to execute the elements of process 700.

It should be noted that process 700 or any step thereof could be performed on, or provided by, any of the devices shown in FIGS. 5-6. For example, process 704 may be executed by control circuitry 506 (FIG. 5) as instructed by the media guidance application implemented on a user device (e.g., user equipment devices 602, 604, and/or 606 (FIG. 6)) in order to detect keywords in the verbal conversation without receiving a wakeword. In addition, one or more steps of process 700 may be incorporated into or combined with one or more steps of any other process or embodiment described herein.

Step 702 may include the media guidance application monitoring, with user equipment, verbal conversation among a plurality of users. In some embodiments, the media guidance application may detect speech, and accordingly record received audio signals from speech. The media guidance application may apply any suitable speech recognition algorithm to identify words, phrases, sounds, voices (e.g., which user is talking), or other audible portions of a conversation. For example, the media guidance application may use a neural network technique, a hidden Markov models (HMM) technique, pattern recognition (e.g., comparing speech to reference), a dynamic time warping (DTW) based technique (e.g., comparing user to user, or user to reference), a biometric technique (e.g., to differentiate different speakers), any other suitable speech recognition technique, any other suitable speaker identification technique, or any combination thereof.

Step 704 may include the media guidance application detecting keywords in the verbal conversation without receiving a wakeword. In some embodiments, the media guidance application may detect keywords from a plurality of words recognized at step 702. For example, the media guidance application may detect nouns (e.g., "boat"), proper nouns (e.g., "Staten Island Ferry"), short phrases (e.g., "car chase"), verbs, adjectives, adverbs, or any combination thereof that are not the wakeword. In a further example, the media guidance application may perform steps 702 and 704 simultaneously, and detect keywords directly recognized from the conversation. A keyword may include a single word, a sequence of words (e.g., a phrase), a proper noun, a noun, a verb, any other collection of one or more words, or any combination thereof.

Step 706 may include the media guidance application searching for content matching one of the keywords (e.g., keywords detected at step 704). In some embodiments, the media guidance application may query metadata from a plurality of media assets to find relevant content. Step 706 may be performed by media guidance data source 618, user computer equipment 604, user television equipment 602, wireless user communications device 606, or any combination thereof. For example, user television equipment 602 may monitor a conversation and detect keywords (e.g., steps 702 and 704), and then send a query via communication network 614 to media guidance data source 618 to perform the searching of step 706. Accordingly, in this illustrative example, media guidance data source 618 may identify a plurality of media assets that have metadata corresponding to the searched keywords. Further, media guidance data source 618 may provide a list of the plurality of media assets, and the assets themselves, to user television equipment 602.

Step 708 may include the media guidance application automatically, without receiving the wakeword, presenting the content to the users. In some embodiments, the media guidance application may present a playable clip on a display device by generating a display screen. In some embodiments, the media guidance application may make available for display more than one clip. For example, the media guidance application may present a list of relevant clips, and play one of the clips of the list based on receiving user input selecting the clip.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 7.

FIG. 8 is a flowchart of an illustrative process 800 for recommending content in context of a conversation, in accordance with some embodiments of the disclosure. For example, the media guidance application may instruct control circuitry 604 to execute the elements of process 800.

It should be noted that process 800 or any step thereof could be performed on, or provided by, any of the devices shown in FIGS. 5-6. For example, process 804 may be executed by control circuitry 506 (FIG. 5) as instructed by the media guidance application implemented on a user device (e.g., user equipment devices 602, 604, and/or 606 (FIG. 6)) in order to process words in a verbal conversation to selectively retrieve keywords from the verbal conversation. In addition, one or more steps of process 800 may be incorporated into or combined with one or more steps of any other process or embodiment described herein.

Step 802 may include the media guidance application monitoring a verbal conversation among a plurality of users, with user equipment. Monitoring the verbal conversation may include, for example, identifying a conversation (e.g., identifying audio signals from at least two distinct users), recording audio data gathered from audio input device 520, responding to a detection of speech, or any other suitable action for monitoring a conversation. In some embodiments, the media guidance application may enter a listening mode, for example, in which the media guidance application processes audio signals, and makes determinations as to whether a conversation has started, what the keywords are, and what content is relevant. The media guidance application may enter a listening mode, for example, on a predetermined schedule, upon determination that any user is speaking, upon determination that a particular user is speaking (e.g., a logged-in account user), upon determination that more than one user is speaking, during a popular show, during a highly anticipated and subscribed to event, or during a sports game. For example, the media guidance application may enter listening mode when presenting the season premiere of a popular television show. In some embodiments, the media guidance application may process audio signals whenever the user device is powered (e.g., turned on). For example, referencing FIG. 1, user device 102 may host the media guidance application which may monitor audio signals continuously for detectable speech.

It will be understood that a verbal conversation is sometimes defined as a speech interaction among two or more people. However, a single user may converse with themself (e.g., talk to themself), or make utterances to no audience. In some circumstances, for example, the media guidance application may determine that any such speech is a conversation. For example, the media guidance application may construe as a conversation a user making comments to a display device such as "good play, Steph Curry, go team." In a further example, the media guidance application may determine how many users are speaking (e.g., using voice recognition). In a further example, the media guidance application may distinguish among multiple voices of a single user (e.g., a user re-enacting a conversation and imitating multiple voices).

Step 804 may include the media guidance application processing words in the verbal conversation to selectively retrieve keywords from the verbal conversation, as the verbal conversation continues. The media guidance application may process words using any suitable word detection technique, speech detection technique, pattern recognition technique, signal processing technique, or any combination thereof. For example, the media guidance application may compare a series of signal templates to a portion of an audio signal to find whether a match exists (e.g., whether a particular word is included in the audio signal). In a further example, the media guidance application may apply a learning technique to better recognize words in conversation. For example, the media guidance application may gather feedback from a user on a plurality of content recommendations in the context of a plurality of conversations, and accordingly use past data as a training set for making recommendations.

Step 806 may include the media guidance application detecting the keywords in the verbal conversation without receiving a wakeword based on the selectively retrieved keywords. In some embodiments, the media guidance application may combine steps 804 and 806, detecting keywords from a speech signal. In some embodiments, the media guidance application may first process words from conversation, and then among the processed words detect keywords. In some embodiments, the media guidance application may consider each retrieved keyword of step 804, and detect which keywords to use for searching at step 808.

Step 808 may include the media guidance application searching a plurality of clips for a clip matching one of the keywords (e.g., of step 806). The media guidance application may, for example, search for metadata that matches each keyword among the detected keywords of step 806. For example, the media guidance application may generate a query including all keywords (e.g., using fields and Boolean operators) to query a media content database (e.g., media guidance data source 618). In some embodiments, the media guidance application may store the plurality of clips matching at least one keyword, store a plurality of links corresponding to each respective clip, store metadata corresponding to each respective clip, or otherwise store an indicator of the plurality of clips resulting from the search. In some embodiments, the media guidance application may identify a content source at step 808 to aid in searching content. For example, the media guidance application may detect keywords associated with sports, and accordingly may search for clips among a database of sports highlights and records. Illustrative content sources for sports may include, for example, YouTube, SkySports, NBCSports, ESPN, or other sources. In some embodiments, the media guidance application may access a database (e.g., media guidance data source 618) that may include content sources, and accompanying metadata providing information about the content source. The media guidance application may generate a query to search the database, or use any other database searching techniques, to retrieve one or more content sources corresponding to the keywords.

Step 810 may include the media guidance application comparing metadata associated with each of the plurality of clips with the detected keywords. In some embodiments, metadata may include descriptive metadata (e.g., content title, actor appearing in clip, director, genre, clip rating, clip popularity), structural metadata (e.g., clip duration, parameters for accessing clip, which portion of a clip is relevant), administrative metadata (e.g., permissions, file size, file type), any other suitable metadata, or any combination thereof. In some embodiments, the media guidance application may combine steps 808 and 810, searching the plurality of clips using metadata for each clip.

Step 812 may include the media guidance application selecting, based on the comparing (e.g., of step 810), the clip of the plurality of clips having metadata matching more of the keywords than metadata associated with another one of the clips. In some embodiments, the media guidance application may determine how many keywords match metadata corresponding to a clip, determine the length of the longest keyword that matches metadata for a clip, perform any other determination that may aid in selecting a clip, or any combination thereof. In some embodiments, the media guidance application may select a clip based on one or more auxiliary selection criteria. For example, the media guidance application may consider a popularity of each of the plurality of clips, and select a clip based at least in part on the popularity (e.g., select a relatively popular clip over a more obscure clip).

Step 814 may include the media guidance application automatically, without receiving the wakeword, presenting the clip to the users during the verbal conversation. The media guidance application may present the clip in response to detecting a conversation, identifying keywords, and searching for clips based on the keywords, and without any explicit command words or directed utterances causing a specific action. For example, the media guidance application may present a clip to users during a conversation without the users even being aware of the performance of steps 802 through 812. Accordingly, the media guidance application does not require the conversation to stop to initiate the content recommendation.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 8.

Figure 9:
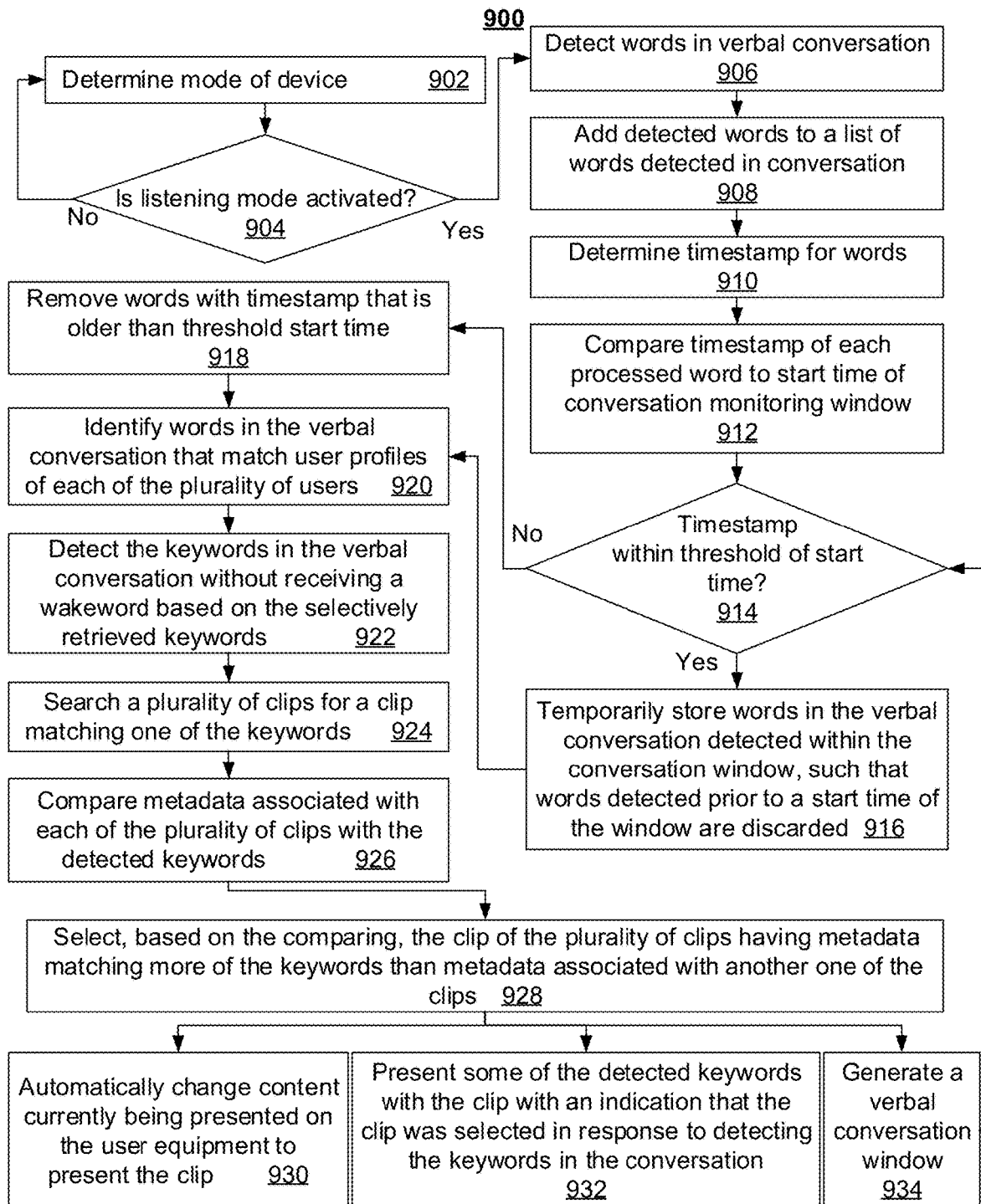
FIG. 9 is a flowchart of an illustrative process for recommending content in context of a conversation, in accordance with some embodiments of the disclosure.

FIG. 9 is a flowchart of an illustrative process 900 for recommending content in context of a conversation, in accordance with some embodiments of the disclosure. For example, the media guidance application may instruct control circuitry 604 to execute the elements of process 900.

It should be noted that process 900 or any step thereof could be performed on, or provided by, any of the devices shown in FIGS. 5-6. For example, process 902 may be executed by control circuitry 506 (FIG. 5) as instructed by the media guidance application implemented on a user device (e.g., user equipment devices 602, 604, and/or 606 (FIG. 6)) in order to process words in a verbal conversation to selectively retrieve keywords from the verbal conversation. In addition, one or more steps of process 900 may be incorporated into or combined with one or more steps of any other process or embodiment described herein.

Step 902 may include the media guidance application determining a mode of a device configured to enter a listening mode. A mode may include any suitable state of the device indicated by, for example, "sleep mode," "listening mode," "not-listening mode," "on," "off," "processing" (e.g., busy), "ready," or any other suitable indicator. In some embodiments, the media guidance application may enter a mode as part of step 902. For example, the media guidance application may activate a listening mode if the media guidance application determines that it is not already in listening mode. In some embodiments, the media guidance application may access a mode value in memory to determine a mode. For example, the media guidance application may store in memory a variable corresponding to mode (e.g., listening mode is stored as 00), and the media guidance application may access the variable to determine the mode based on the value (e.g., if the variable value is 00, then the device is in listening mode). In some embodiments, the media guidance application may access a mode flag in memory to determine a mode. For example, the media guidance application may access a listening mode flag, and if that flag value is 1, then the media guidance application determines the device is in listening mode.

Step 904 may include the media guidance application determining if a listening mode is activated. In some embodiments, the media guidance application may identify a mode flag in memory to determine if a listening mode is activated. In some embodiments, the media guidance application may check whether a conversation is ongoing to decide that listening mode is activated. For example, the media guidance application may detect for speech at predetermined intervals, and if speech is detected, the media guidance application may activate listening mode. In a further example, the media guidance application may always have an audio input device active, and if speech is detected, the media guidance application may activate listening mode. In some embodiments, the media guidance application may receive a user input to activate listening mode, or be prepared to activate listening mode if speech is detected.

If the media guidance application determines that a listening mode is not activated, the media guidance application may proceed to step 902. In some embodiments, the media guidance application may loop between steps 902 and 904 until a conversation is detected. If the media guidance application determines that a listening mode is activated, the media guidance application may proceed to step 906.

Step 906 may include the media guidance application detecting words in verbal conversation. In some embodiments, the media guidance application may store snippets (i.e., short time durations) of recorded audio during a conversation, and process the snippets. In some embodiments, the media guidance application may store relatively large parts of a conversation (e.g., more than 10 seconds) as an audio file, and process the file. In some embodiments, the media guidance application may process speech to detect words by using a continuous computation. For example, a wavelet transform may be performed on speech in real time, providing a continuous, if slightly time-lagged, computation of speech patterns (e.g., which could be compared to a reference to identify words). In some embodiments, the media guidance application may detect words, as well as which user uttered the words in accordance with the present disclosure.

Step 908 may include the media guidance application adding detected words to a list of words detected in conversation. In some embodiments, the media guidance application may store words in memory. For example, the media guidance application may store in memory words as a collection of ASCII characters (i.e., 8-bit code), a pattern (e.g., indicating a speech signal reference used to match the word), an identifier (e.g., a code for a word), a string, any other datatype, or any combination thereof. In some embodiments, the media guidance application may add words to memory as they are detected. For example, the media guidance application may append a string of previously detected words with a newly detected word, add a newly detected word to a cell array of previously detect words (e.g., increase the cell array size by one), create a new variable corresponding to the newly detected word, create a new file corresponding to the newly created word, or otherwise store one or more words detected at step 906.

Step 910 may include the media guidance application determining a timestamp for detected words. In some embodiments, the media guidance application may determine a start time, stop time, utterance time (e.g., absolute time when a word was uttered), processing time (e.g., when a pattern match was found), a storage time, (e.g., when the word was written to memory), a current time (e.g., time of timestamp determination), any other suitable time corresponding to the word's relative temporal position in the conversation, or any combination thereof. A timestamp may include a date, a 12-hour clock time, a 24-hour clock time, an elapsed time relative to some event, a relative temporal position to other words, a number of time-steps (e.g., a hundred milliseconds represented as ten 10-microsecond time-steps), any other deterministic metric of time, or any combination thereof. For example, a timestamp may include "5:17:15 PM 10/18/2017," "7 seconds from the beginning of a conversation," "0.0001 days from the beginning of a conversation," or "10 time-steps from the end of the conversation." In a further example, a timestamp may include a time range such as "6.5 to 7.6 seconds in a conversation." In some embodiments, a timestamp may additionally include a duration such "700 milliseconds," indicating the duration of the word in the conversation. In some embodiments, the media guidance application may determine a timestamp by determining a start time of a word, and a relative position of the word compared to other words in the conversation. For example, the media guidance application may determine a timestamp for the eighth word of a conversation as a conversation start time, and the number "8." In a further example, the media guidance application may determine a conversation stop time to determine a timestamp for a word.

Step 912 may include the media guidance application comparing a timestamp of each processed word to a start time of a conversation monitoring window. The media guidance application may generate a conversation monitoring window as soon as a conversation is detected, as soon as a word is detected (e.g., at step 906), as soon as listening mode is activated (e.g., at step 904), based on receiving user input indicating that a conversation monitoring window is desired, at any other suitable time, or any combination thereof. In some embodiments, the media guidance application may determine whether a timestamp for a word corresponds to a time after the start of the conversation. For example, the media guidance application may determine that a conversation started at 5:45:10 pm 10/19/2017, and that a timestamp associated with a word corresponds to 5:45:14 pm 10/19/2017, which is four seconds into the conversation. In some embodiments, the media guidance application may perform steps 910 and 912 simultaneously (or as a single step), but determining a timestamp relative to a start time of a conversation monitoring window.

Step 914 may include the media guidance application determining whether a timestamp is within a threshold of a start time. In some embodiments, the media guidance application may determine a difference between a timestamp corresponding to a word of a conversation and a timestamp corresponding to a start of the conversation. In some embodiments, the media guidance application may determine a threshold based on memory constraints (e.g., allotting only enough memory for 10 seconds of conversation). In some embodiments, the media guidance application may receive user input indicating a threshold. For example, the media guidance application may receive a user command to consider only words within 10 seconds of a start time of a conversation as part of the conversation. In some embodiments, the media guidance application may perform the determination of step 914 based at least in part on a timestamp of a word, a start time of a conversation monitoring window, received user input, a threshold, a determined lull in conversation (e.g., if a lull is detected, consider words before the lull as outside of the threshold), any other suitable determination or information, or any combination thereof. The media guidance application may perform step 914 to determine whether the word is relevant to the conversation, or perhaps if a new conversation monitoring window is preferred.

If the media guidance application determines that a timestamp is within a threshold of a start time (e.g., "yes" path from step 914 in FIG. 9), then the media guidance application may proceed to step 916. Step 916 may include the media guidance application temporarily storing, within the conversation window, words detected in the verbal conversation such that words detected prior to a start time of the window are discarded.

If the media guidance application determines that a timestamp is not within a threshold of a start time (e.g., "no" path from step 914 in FIG. 9), then the media guidance application may proceed to step 918. Step 918 may include the media guidance application removing words with a timestamp that is older than a threshold relative to a start time (e.g., not within the threshold of the start time).

Step 920 may include the media guidance application identifying words in the verbal conversation that match user profiles of each of the plurality of users. The plurality of users may include one or more users engaged in the verbal conversation, one or more users associated with a user device, one or more users subscribing to a particular service (e.g., subscribed to have a voice-activated personal assistant, subscribed to Hulu), one or more users that are logged in to the media guidance application, one or more users identified by receiving user input identifying the one or more of the users, any other relevant users, or any combination thereof.

Step 922 may include the media guidance application detecting keywords in the verbal conversation without receiving a wakeword based on selectively retrieved keywords. The media guidance application may provide relevant content in the context of a conversation without receiving a wakeword. The media guidance application may apply any suitable speech recognition technique, voice recognition technique, or combinations thereof, to detect keywords in the conversation. For example, referencing FIGS. 1-2, the media guidance may start a verbal conversation processing window at the start of conversation 100, without either of users 130 or 140 giving a verbal command to the media guidance application. The media guidance application may begin processing a conversation when any words are spoken in a conversation. Accordingly, if user 130 uttered "start listening mode now, user device 102," user device 102 may identify the words of the utterance, and identify keywords for searching for relevant content. The actions of the media guidance application, in this circumstance, may be the same for any other utterance. Accordingly, the media guidance application does not require a verbal command (e.g., a wakeword) from the user to begin performing suitable steps.

Step 924 may include the media guidance application searching a plurality of clips for a clip matching one of the keywords. When the media guidance application identifies one or more keywords, the media guidance application may proceed to step 924 to perform a search based on the one or more keywords. The media guidance application may apply any suitable search technique to search a plurality of clips for a match. For example, the media guidance application may retrieve metadata associated with the plurality of clips, and perform a keyword to metadata matching search. In a further example, the media guidance application may access a database and perform a search using the one or more keywords. In a further example, the media guidance application may identify a content source and then perform a search of available content for the content source.

Step 926 may include the media guidance application comparing metadata associated with each of the plurality of clips with the detected keywords. For example, the media guidance application may compare descriptive metadata corresponding to a clip to each of the keywords. The media guidance application may generate a comparison metric (e.g., how close each clip of the plurality of clips matches keywords), in order to allow a numerical comparison. For example, the media guidance application may compute how many keywords match metadata corresponding to a clip. In a further example, the media guidance application may compute the longest matching sequence of words (e.g., a phrase) in a keyword or that matches a phrase in metadata corresponding to each clip.

Step 928 may include the media guidance application selecting, based on the comparing, the clip of the plurality of clips having metadata matching more of the keywords than metadata associated with another one of the clips. In some embodiments, the media guidance application may determine how many keywords match metadata corresponding to a clip, determine the length of the longest keyword that matches metadata for a clip, perform any other determination that may aid in selecting a clip, or any combination thereof. In some embodiments, the media guidance application may select a clip based on one or more auxiliary selection criteria. For example, the media guidance application may consider an available source for each of the plurality of clips, and select a clip based at least in part on the source (e.g., select a relatively popular source over a more obscure source).

Step 930 may include the media guidance application automatically changing content currently being presented on the user equipment to present the clip. In some circumstances, a conversation may occur while the media guidance application is already presenting content. In some such circumstances, the media guidance application may, for example, replace the already-playing content with the clip selected at step 928. The media guidance application may apply an overlay, split screen, picture in picture, complete replacement with the selected clip, or other display change to present the selected clip to the users engaged in conversation.

Step 932 may include the media guidance application presenting some of the detected keywords with the clip with an indication that the clip was selected in response to detecting the keywords in the conversation. In some embodiments, along with the relevant clip, the media guidance application may present one or more keywords used in selecting the clip. The media guidance application may present the one or more keywords in a same display region as the clip, or a different display region. In some embodiments, the media guidance application may present a subset of the keywords (e.g., the most popular keywords, the most descriptive keywords, or the keywords that refine the search the most). In some embodiments, the media guidance application may present additional information along with the keywords. For example, the media guidance application may present which user uttered each keyword, one or more alternative keywords (e.g., if a keyword was selected in error, or if a word was detected erroneously), a name for the conversation, or other information relevant to the conversation.

Step 934 may include the media guidance application generating a verbal conversation window (e.g., also referred to herein as a conversation processing window). A verbal conversation window may include a time duration, a start time and stop time, a number words, any other suitable metric for identifying when speech corresponds to a conversation, or any combination thereof. In some embodiments, a verbal conversation window may indicate the length in time of a conversation. In some embodiments, the media guidance application may generate a verbal conversation window to define the extent of a conversation (e.g., when it started and when it ended). Accordingly, in some embodiments, the media guidance application may, for example, confine processing of speech to only that speech detected within the verbal conversation processing window. It will be understood that while shown as the last step in illustrative flowchart 900, step 934 may be performed at any suitable point in time, and may span any suitable time. For example, the media guidance application may determine a start time of a conversation, and a beginning time of a conversation processing window. Further, the media guidance application may, for example, determine a stop time for a verbal conversation window at a later time relative to determining the start time (e.g., when the conversation ends, or after a predetermined length of time).

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 9.

Figure 10:
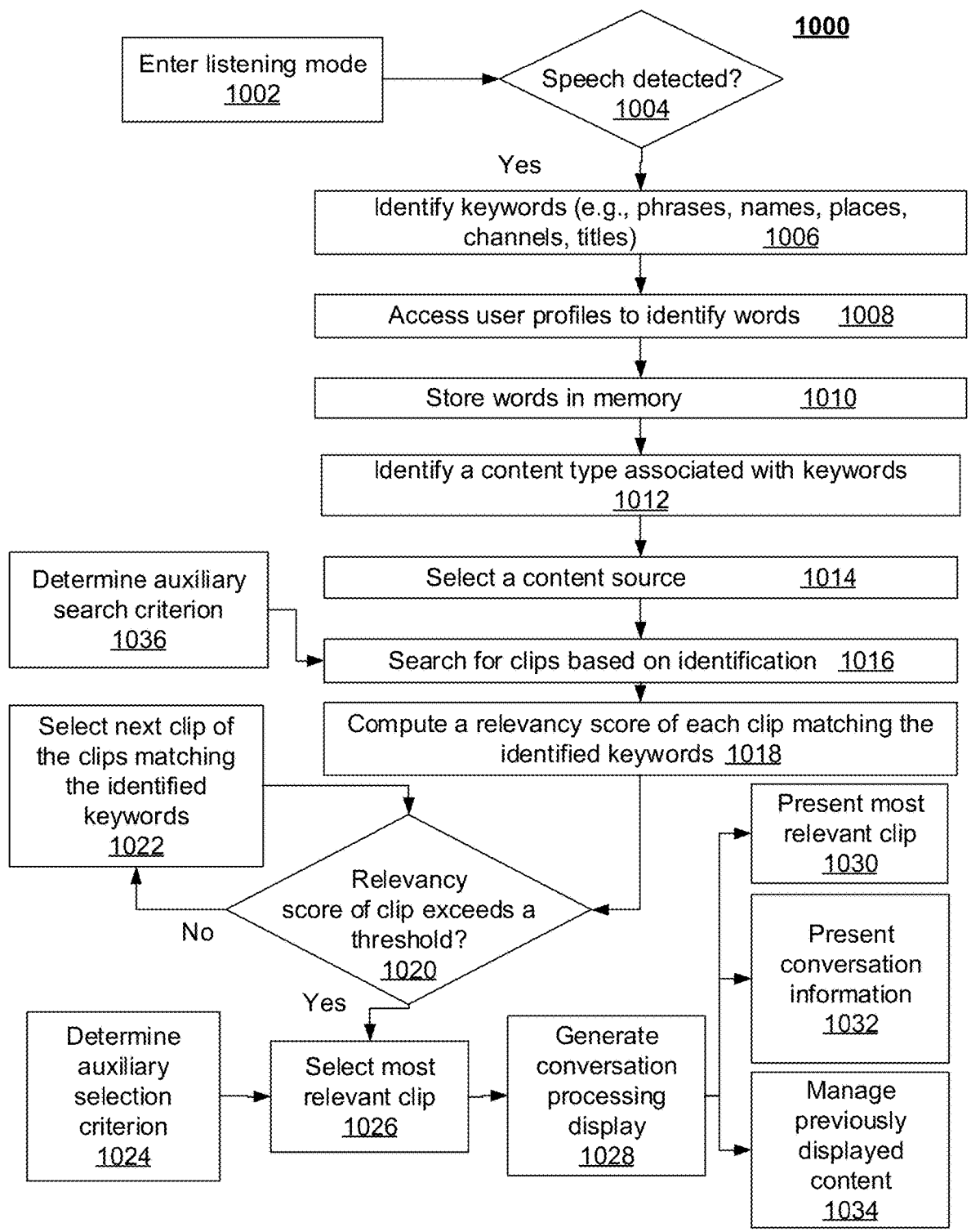
FIG. 10 is a flowchart of an illustrative process for recommending content in context of a conversation, in accordance with some embodiments of the disclosure.

FIG. 10 is a flowchart of an illustrative process 1000 for recommending content in context of a conversation, in accordance with some embodiments of the disclosure. For example, the media guidance application may instruct control circuitry 604 to execute the elements of process 1000.

It should be noted that process 1000 or any step thereof could be performed on, or provided by, any of the devices shown in FIGS. 5-6. For example, process 1014 may be executed by control circuitry 506 (FIG. 5) as instructed by the media guidance application implemented on a user device (e.g., user equipment devices 602, 604, and/or 606 (FIG. 6)) in order to select a content source. In addition, one or more steps of process 1000 may be incorporated into or combined with one or more steps of any other process or embodiment described herein.

Step 1002 may include the media guidance application entering a listening mode. The media guidance application may, for example, activate an audio input device (e.g., a microphone), begin recording audio signals, begin processing audio signals, access one or more user accounts (e.g., access user information), generate for display a conversation monitoring display, update a flag value stored in memory (e.g., a listening mode flag set to value 1 when in listening mode), perform any other suitable action, or any combination thereof. In some embodiments, the media guidance application may provide an indication to users that it has entered listening mode. For example, the media guidance application may cause an LED on a device (e.g., a user equipment device) to change color, turn on, turn off, dim, brighten, flash, or otherwise change appearance to indicate entrance to listening mode. In a further example, the media guidance application may generate an audio message (e.g., using speakers 514) to alert users that listening mode is active.

Step 1004 may include the media guidance application determining if speech is detected. In some embodiments, the media guidance application may detect for speech at predetermined intervals. In some embodiments, the media guidance application may be configured to detect and recognize speech, but not necessarily respond to voice commands. For example, in some embodiments, the media guidance application may detect, recognize, and store words, but only respond to commands received from user equipment (e.g., a TV remote, a mouse, a keyboard, a button on a user device) rather than voice commands. Accordingly, in some embodiments, the media guidance application may listen to, and process, a conversation but not recognize, or respond to, wakewords.

If, at step 1004, the media guidance application determines that speech has not been detected, the media guidance application may make further determinations on how to proceed. Further, the media guidance application may perform any of the steps of illustrative flowchart 1000 to determine whether speech is detected or not. For example, the media guidance application may timeout at step 1004 after a predetermined period of time (e.g., no speech for 10 seconds means "not detected"). In a further example, steps 1002 and 1004 may be performed in reversed order from that shown in FIG. 10 such that the media guidance application enters listening mode only when speech is detected. In a further example, the media guidance application may require that at least two voices be recognized at step 1004 to indicate that a conversation is underway. In a further example, steps 1004 and 1006 may be performed in reversed order from that shown in FIG. 10 such that the media guidance application enters listening mode only when one or more keywords are identified. In a further example, the media guidance application may process audio signals (e.g., a windowed Fast Fourier Transform, a wavelet transform) and determine when signal energy in certain suitable frequency bands (e.g., a spectral intensity, or spectral density) is above a threshold, which may indicate speech. In a further example, the media guidance application may apply speech recognition computations and voice recognition computations to audio signals and determine when words are recognized.

Step 1006 may include the media guidance application identifying keywords such as, for example, words, phrases, names, places, channels, media asset titles, or other keywords. In some embodiments, the media guidance application may identify words in speech, and select some of those words as keywords. For example, the media guidance application may identify words, and among those words select words that are not prepositions. In a further example, the media guidance application may identify as a keyword only a word that is at least three characters long. In a further example, the media guidance application may identify keywords as a phrase including two or more words (e.g., to be more descriptive and provide more context) which may be helpful to narrow a potential search field of relevant content. The media guidance application may use any suitable criteria to identify keywords from a conversation.

Step 1008 may include the media guidance application accessing one or more user profiles to identify words. In addition to identifying words from speech, the media guidance application may further use information from a user's profile to provide relevant content. For example, the media guidance application may identify the keywords "Detroit," "football," and "game," and access a user's profile to determine that they have a "Detroit Lions" game stored in a DVR. Accordingly, the media guidance application may identify the word "Lions" to accompany the keywords "Detroit," "football," and "game," to more fully capture the relevant information of the conversation. In a further example, the media guidance application may identify a keyword from speech, and which user uttered the keyword, and access the respective user's profile to identify words. Words identified from a user's profile may include titles of media content watched, titles of favorite shows, titles of purchased media content, titles of recommended media content, personal information (e.g., city where user lives, state where user lives, demographic information), name of a user's favorite or most watched genre, previous conversation keywords associated with the user, any other words associated with a user's profile, or any combination thereof.

Step 1010 may include the media guidance application storing words in memory. In some embodiments, the media guidance application may store words along with a timestamp, conversation information, user information, any other suitable information, or any combination thereof. The media guidance application may store words in any suitable format and structure.

Step 1012 may include the media guidance application identifying a content type associated with keywords. A content type may include, for example, a movie clip, a sports contest clip (e.g., a highlight from a sports game), a clip from an episodic media asset (e.g., a scene from a television show), any other suitable classification of media content, any subdivision thereof, or any combination thereof. In some embodiments, a content type may include a characterization categorization of a content type. For example, the media guidance application may identify a content type as a genre. In some embodiments, a content type may include a clip length (e.g., short clip, long clip, scene, trailer). For example, the media guidance application may identify a content type as "clips less than 30 seconds in length." The media guidance application may identify a content type to aid in identifying content relevant to an ongoing conversation, reduce a potential search field, reduce a potential content source field, provide content within a duration range to accompany a conversation, or otherwise aid in providing content in context of a conversation.

Step 1014 may include the media guidance application selecting a content source. A content source may include a content provider, a content subscription service, media guidance data source 618, a content server, an on-demand content service, an online video service, any other suitable content providing source, or any combination thereof. In some embodiments, the media guidance application may select a content source based on one or more users' subscriptions (e.g., a user subscribes to Hulu). In some embodiments, the media guidance application may select a content source based on one or more content sources that one or more users is logged in to (e.g., a user may be logged in to a YouTube account, a user may be logged in to HBO GO).

Step 1016 may include the media guidance application searching for clips based on at least one of identifying one or more keywords and identifying a content type. In some embodiments, the media guidance application may query a content source (e.g., a content source selected at step 1014) by transmitting the identified keywords to the source. In some embodiments, the media guidance application may retrieve metadata from a content source and search matches between one or more keywords and words included in the metadata. Accordingly, the media guidance application may retrieve content based on the searched metadata. In some embodiments, the media guidance application may perform more than one search, using any, all, or a subset of the keywords. For example, the media guidance application may target a desired number of search results, and may apply keywords and one or more search filters to achieve the number of desired search results (e.g., be within a threshold range of results, be above a threshold number of results, or be below a threshold number of results). The media guidance application may apply any suitable search technique, database schema, query language, logical operators, type of search, search filters, search engines, any other suitable tools, or any combination thereof. For example, the media guidance application may apply Boolean logic (e.g., first keyword AND second keyword), phrase searching (e.g., match "Monday Night Football"), truncation, wildcards (e.g., match "Game of *" in which "*" is a wildcard), metadata field searching (e.g., search a title field, search a keyword field), or other search techniques. Step 1016 may include the media guidance application retrieving any suitable metadata or other suitable content information corresponding to media content.

In some embodiments, the media guidance application may determine one or more auxiliary search criteria, as shown by step 1036 of flowchart 1000. Auxiliary search criteria may include criteria for search filters, thresholds, user profile criteria (e.g., parental controls that are applied, favorite services, subscribed services), user-defined criteria (e.g., defining search parameters such as how many keywords to search, how many search results to consider), any other suitable criteria, or any combination thereof. In some embodiments, the media guidance application may apply information from a user's profile (e.g., accessed at step 1008) to refine a search by applying filters.

Step 1018 may include the media guidance application computing a relevancy score of each clip matching the identified keywords. In some embodiments, the media guidance application may compute a relevancy score by summing the number of keyword matches that were identified at step 1016. In some embodiments, the media guidance application may store data computed for the search. For example, the media guidance application may compute a number of keyword-to-metadata matches for each keyword (e.g., data associated with clip #2 of search results matched three keywords). In a further example, the media guidance application may compute the longest phrase from a conversation (e.g., number of words) that was matched to metadata and store the phrase length. Illustrative Table 1 shows a listing of search results, search information, and a relevancy score. In the illustrative example shown in Table 1, search information includes number of keywords matched, length of longest phrase matched, and a popularity score. Illustrative Table 1 includes an exemplary relevancy score, computed as the average of the three search result scores (e.g., rows of numbers in Table 1).

TABLE 1

Illustrative Relevancy Score Computation

| Search Results | Keywords matched | Longest matched phrase | Clip popularity | Relevancy Score |
|---|---|---|---|---|
| Clip 1 | 6 | 2 | 7 | 5 |
| Clip 2 | 3 | 5 | 8 | 5.3 |
| Clip 3 | 2 | 3 | 10 | 5 |
| Clip 4 | 2 | 2 | 1 | 1.7 |

The computation of Table 1 is illustrative, and any suitable relevancy score may be computed based on any suitable search information. For example, a relevancy score may be based on a sum, a product, a weighted sum, an average, a function which may take one or more scores as input, an algorithm which may take one or more scores as input, any other suitable computation, or any combination thereof (e.g., such as a weighted sum). In a further example, the media guidance application may compute a plurality of relevancy scores (e.g., two or more) and combine the scores in a suitable way. In a further example, the media guidance application may compute a plurality of relevancy scores and store the plurality of relevancy scores without combining.

Search information may include, for example, a number of matched keywords (e.g., per clip), a length of a longest phase matched, a popularity score (e.g., a number of views, a user rating), a content source score (e.g., based on user reviews, based on known reliability, based on whether a user has a subscription granting access to the source), a previous membership among search results (e.g., a repeated or a regular conversation topic), a number of sources available to provide the clip, any other metric which may indicate a clip's relevancy, or any combination thereof.

Step 1020 may include the media guidance application determining whether one or more relevancy scores corresponding to one or more respective clips exceeds a threshold. In some embodiments, the media guidance application may sequentially consider each clip and corresponding relevancy score, compare the score to a threshold, and make the relevancy determination (i.e., is the clip relevant). For example, for a search result list with ten clips, the media guidance application may perform step 1020 ten times. In some embodiments, the media guidance application may consider a plurality of clips from search results, compare the clips' respective relevancy scores to a threshold, and make the relevancy determination. For example, the media guidance application may perform a vector comparison to a vector of threshold values, thereby performing step 1020 as a relatively more consolidated action. In some embodiments, the media guidance application may combine steps 1018 and 1020. For example, the media guidance application may compute a relevancy score at step 1018 that includes the comparison to a threshold from step 1020. In some embodiments, the media guidance application may omit step 1020. For example, the media guidance application may compute a relevancy score for each clip, and not make any comparison to a threshold (e.g., and proceed to step 1026).

If the media guidance application determines that a relevancy score does not exceed a threshold at step 1020, the media guidance application may proceed to step 1022. Step 1022 may include the media guidance application selecting a next group of one or more clips of the clips matching the identified keywords. In some embodiments, the media guidance application may store respective flags, each corresponding to a clip and indicating whether the clip's corresponding relevancy score exceeds a threshold (e.g., a flag value of 0 means does not exceed, a flag value of 1 means exceeds). In some embodiments, the media guidance application may repeat steps 1020 and 1022 until the entire list of search results has been evaluated at step 1020. In some embodiments, the resulting list of clips from step 1020 (e.g., which is equal to or less in number than the search results) may be stored in memory for further processing at step 1026.

Step 1026 may include the media guidance application selecting a most relevant clip. Selecting a most relevant clip may include, for example, identifying the largest relevancy score of the resulting list of clips from step 1020. In some embodiments, the media guidance application may select more than one most relevant clips. For example, the media guidance application may select a most relevant clip, as well as a second and third most relevant clip (e.g., as alternatives, or as backups, or to provide selectable options to a user).

In some embodiments, the media guidance application may select the most relevant clip based at least in part on one or more auxiliary selection criteria, as shown in step 1024. Step 1024 may include the media guidance application determining auxiliary selection critera. Auxiliary selection criteria may include, for example, user access (e.g. parental control limitations on content), a preferred content source (e.g., if there is a clip from HBO, then select it), a preferred clip duration (e.g., if a clip is less than 10 seconds, preferentially select it), clip format, any other suitable criteria, or any combination thereof.

In some embodiments, the media guidance application may eliminate titles from search results that are no longer of interest. In some embodiments, the media guidance application may detect audio cues from conversation (e.g., not limited to direct commands) to optimize the guide content for usability. For example, the media guidance application may detect in conversation "Don't show me any more NBC shows" or "I really hate The Hangover movies" and use keywords based on these utterances to remove search results, or generate a new keyword. In some embodiments, the media guidance application may use a model such as a decision tree or random forest to determine keywords based on detected words. For example, upon identifying the words "I really hate The Hangover movies" from a conversation, the media guidance application may generate keywords "hate" and "Hangover" and remove the movie The Hangover, or clips thereof, from the search results. In a further example, the media guidance application may store the word "Hangover," and use the word to refine search results (e.g., a Boolean NOT to exclude a clip have a title including the word Hangover).

Step 1028 may include the media guidance application generating a conversation processing display. Step 1028 may be performed in any suitable order with the other steps of illustrative flowchart 1000. For example, the media guidance application may generate a conversation processing display that is always displayed, regardless of mode or a conversation being engaged in. In a further example, the media guidance application may generate a conversation processing display if speech is detected at step 1004. The media guidance application may generate a conversation processing display at any suitable time. In some embodiments, the media guidance application may refresh, amend, replace, or otherwise update a conversation display if a new conversation is detected. For example, the media guidance application may identify a new conversation and replace a conversation processing display with a new one, especially if the keywords of the new conversation differ from keywords of the old conversation. In some embodiments, the media guidance application may generate and maintain a conversation processing display only when speech is being detected, and a predetermined time afterwards (e.g., a verbal conversation processing window).

In some circumstances, the media guidance application may present conversation information and a relevant clip, as well as manage content that was being presented prior to the conversation. Illustrative steps 1030, 1032, and 1034 include descriptions of some such presentations. The media guidance application may perform any of steps 1030, 1032, and 1034, or any combination thereof, to provide relevant content to an ongoing conversation. The media guidance application may omit or selectively perform any of steps 1032 and 1034 to provide relevant content to an ongoing conversation.

Step 1030 may include the media guidance application presenting a most relevant clip. In some embodiments, the media guidance application may present a most relevant clip in a region of conversation processing display. In some embodiments, the media guidance application may autoplay a most relevant clip (e.g., not hold for a user input to begin playing the clip). In some embodiments, the media guidance application may hold for a user input to begin playing the clip. For example, the media guidance application may provide a start button or play button, and upon receiving a user selection of the button, being playing the clip.

Step 1032 may include the media guidance application presenting conversation information. In some embodiments, the media guidance application may present conversation information in a conversation processing display. Conversation information may include information regarding utterances of keywords such as, for example, identified keywords, identified users (e.g., users engaged in the conversation), a conversation start time, a conversation stop time, a conversation duration time, a conversation identifier (e.g., "Tuesday chat about the Detroit Lions game"), any other suitable information, or any combination thereof. Conversation information may include information regarding relevant content such as, for example, one or more content listings (e.g., corresponding to relevant clips), a content source identification, a content type identification (e.g., a movie clip, a commercial, a clip from a sports game), any other suitable information, or any combination thereof.

Step 1034 may include the media guidance application managing previously displayed media content. In some circumstances, the media guidance application may have been presenting media content, a listing of media assets, or otherwise generating a display when conversation is detected. In some such circumstances, the media guidance application may pause the previously presented content. For example, a group of users may be watching The Simpsons, and then may start conversing about Game of Thrones. For this example, in some embodiments, the media guidance application may pause The Simpsons, and present a conversation monitoring display which may include conversation information, a relevant clip, and a list of users. For this example, in some embodiments, the media guidance application may continue presenting The Simpsons with the corresponding audio muted, and present a conversation monitoring display (e.g., an overlay) which may include conversation information, and a relevant clip (e.g., and accompanying audio when playing). For this example, in some embodiments, the media guidance application may present a selectable option to the users to indicate if they would prefer to keep watching the previously present content (i.e., The Simpsons in this example), or the relevant clip (i.e., a relevant clip from Game of Thrones in this example). For this example, in some embodiments, the media guidance application may reduce the size of the previously displayed content to allow for a conversation processing display (e.g., split screen). The media guidance application may stop, pause, mute, shrink display size of, overlay, overlay and blur, remove from display, or otherwise manage any suitable aspect of presented content in response to presenting a relevant clip in the context of a conversation.

In circumstances in which, for example, there is no content to manage other than a relevant clip from step 1030, step 1034 may be omitted.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 10.

The above-described embodiments of the present disclosure are presented for purposes of illustration and not of limitation, and the present disclosure is limited only by the claims that follow. Additionally, it should be noted that any of the devices or equipment discussed in relation to FIGS. 5-6 could be used to perform one or more of the steps in processes 700-1000 in FIGS. 7-10, respectively. Furthermore, it should be noted that the features and limitations described in any one embodiment may be applied to any other embodiment herein, and flowcharts or examples relating to one embodiment may be combined with any other embodiment in a suitable manner, done in different orders, performed with addition steps, performed with omitted steps, or done in parallel. For example, each of these steps may be performed in any order or in parallel or substantially simultaneously to reduce lag or increase the speed of the system or method. In addition, the systems and methods described herein may be performed in real time. It should also be noted that the systems and/or methods described above may be applied to, or used in accordance with, other systems and/or methods.

What is claimed is:

1. A method comprising:
monitoring, with user equipment, interactions among a plurality of users;
analyzing the interactions to extract a plurality of keywords from the interactions;
identifying, with control circuitry, a plurality of databases, each database corresponding to at least one of the extracted plurality of keywords;
searching the identified databases for content associated with the extracted keywords; and
without receiving additional user input, displaying, on a display device operatively connected to the user equipment, a keyword of the extracted plurality of keywords.

2. The method of claim 1, further comprising:
searching the identified database for a clip matching one of the extracted keywords; and
presenting the clip on the display device.

3. The method of claim 1, further comprising determining, based on searching a database comprising trending topics, whether one or more of the extracted plurality of keywords corresponds to a trending topic.

4. The method of claim 1, further comprising:
accessing a database comprising a plurality of topics; and
comparing the extracted keywords to the plurality of topics to determine whether the extracted keywords are related to a topic of the plurality of topics.

5. The method of claim 4, further comprising:
in response to determining that a keyword of the extracted keywords is related to a topic of the plurality of topics, updating the keyword based on the comparing.

6. The method of claim 1, further comprising displaying, on the display device, an option bar, wherein the option bar interactively provides, to at least one user of the plurality of users, search options, selection criteria, or display options.

7. The method of claim 1, further comprising:
determining, based on a timestamp associated with the first keyword and a timestamp associated with the second keyword, whether a threshold amount of time has elapsed between a first keyword of the plurality of keywords is extracted and a second keyword of the plurality of keywords is extracted.

8. The method of claim 7, further comprising:
in response to determining that the threshold period of time has elapsed, discarding the first keyword of the plurality of keywords.

9. The method of claim 2, wherein searching the identified database for a clip matching one of the extracted keywords comprises:
comparing metadata associated with each of a plurality of clips with the extracted keywords; and selecting, based on the comparing, the clip of the plurality of clips having metadata matching more of the extracted keywords than metadata associated with another one of the clips.

10. The method of claim 9, wherein at least one of the extracted keywords relates to a segment in a media asset, and wherein each of the plurality of clips represents content in a scene of the media asset.

11. A system comprising:
a memory configured to store a plurality of keywords; and
a control circuitry communicably coupled to the memory, wherein the control circuitry is configured to:
monitor, with user equipment, interactions among a plurality of users;
analyze the interactions to extract a plurality of keywords from the interactions;
identify, with the control circuitry, a plurality of databases, each database corresponding to at least one of the extracted plurality of keywords;
search the identified databases for content associated with the extracted keywords; and
without receiving additional user input, display, on a display device operatively connected to the user equipment, a keyword of the extracted plurality of keywords.

12. The system of claim 11, wherein the control circuitry is further configured to:
search the identified database for a clip matching one of the extracted keywords; and
present the clip on the display device.

13. The system of claim 11, wherein the control circuitry is further configured to determine, based on searching a database comprising trending topics, whether one or more of the extracted plurality of keywords corresponds to a trending topic.

14. The system of claim 11, wherein the control circuitry is further configured to:
access a database comprising a plurality of topics; and
compare the extracted keywords to the plurality of topics to determine whether the extracted keywords are related to a topic of the plurality of topics.

15. The system of claim 14, wherein the control circuitry is further configured to update the keyword based on the comparing in response to determining that a keyword of the extracted keywords is related to a topic of the plurality of topics.

16. The system of claim 11, wherein the control circuitry is further configured to display, on the display device, an option bar, wherein the option bar interactively provides, to at least one user of the plurality of users, search options, selection criteria, or display options.

17. The system of claim 11, wherein the control circuitry is further configured to determine, based on a timestamp associated with the first keyword and a timestamp associated with the second keyword, whether a threshold amount of time has elapsed between a first keyword of the plurality of keywords is extracted and a second keyword of the plurality of keywords is extracted.

18. The system of claim 17, wherein the control circuitry is further configured to discard the first keyword of the plurality of keywords in response to determining that the threshold period of time has elapsed.

19. The system of claim 12, wherein the control circuitry is further configured to:
compare metadata associated with each of a plurality of clips with the extracted keywords; and
select, based on the comparison, the clip of the plurality of clips having metadata matching more of the extracted keywords than metadata associated with another one of the clips.

20. The system of claim 19, wherein at least one of the extracted keywords relates to a segment in a media asset, and wherein each of the plurality of clips represents content in a scene of the media asset.

* * * * *